United States Patent
Chen et al.

(10) Patent No.: US 8,730,979 B2
(45) Date of Patent: May 20, 2014

(54) METHOD AND SYSTEM FOR INCREASING FORWARDING EFFICIENCY OF VIRTUAL PRIVATE LAN SERVICE NETWORK

(75) Inventors: Ran Chen, Shenzhen (CN); Lizhong Jin, Shenzhen (CN); Bo Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 52 days.

(21) Appl. No.: 13/574,903

(22) PCT Filed: Sep. 15, 2010

(86) PCT No.: PCT/CN2010/076942
§ 371 (c)(1),
(2), (4) Date: Jul. 24, 2012

(87) PCT Pub. No.: WO2011/095008
PCT Pub. Date: Aug. 11, 2011

(65) Prior Publication Data
US 2012/0294193 A1    Nov. 22, 2012

(30) Foreign Application Priority Data
Feb. 8, 2010  (CN) .......................... 2010 1 0112247

(51) Int. Cl.
*H04L 12/28* (2006.01)
(52) U.S. Cl.
USPC ............................ 370/401; 370/432; 370/390
(58) Field of Classification Search
None
See application file for complete search history.

(56) References Cited

U.S. PATENT DOCUMENTS

| 8,111,633 B1 * | 2/2012 | Aggarwal et al. ............. 370/256 |
| 2007/0239891 A1 | 10/2007 | Wainner et al. |
| 2011/0080836 A1 * | 4/2011 | Bragg et al. ............... 370/241.1 |

FOREIGN PATENT DOCUMENTS

| CN | 1925449 A | 3/2007 |
| CN | 101001196 A | 7/2007 |
| CN | 101005443 A | 7/2007 |

OTHER PUBLICATIONS

International Search Report for PCT/CN2010/076942 dated Dec. 3, 2010.
Raymond Key et al. "A Framework for E-Tree Service over MPLS Network"; draft-key-l2vpn-etree-frwk-01.txt; Network Working Group Internet Draft; Informational; Jan. 22, 2010; XP15066396A; See pp. 1-32.
Luca Martini et al. "Signaling Root-Initiated Point-to-Multipoint Pseudowires using LDP", draft-martini-pwe3-p2mp-pw-01.txt; Internet Engineering Task Force Internet Draft, Standards Track, Apr. 24, 2010; Oct. 24, 2009; XP15064994A; See pp. 1-18.

(Continued)

*Primary Examiner* — Duc C Ho
(74) *Attorney, Agent, or Firm* — Ling Wu; Stephen Yang; Ling and Yang Intellectual Property (57) ABSTRACT

The present invention provides a method and system for increasing forwarding efficiency of a virtual private LAN services network. The method includes: a root node provider edge (PE) in the VPLS network transmitting at least one of broadcast message, multicast message and unknown unicast message to leaf nodes PE in the same VPLS through a point-to-multipoint pseudo wire (P2MP PW). The present invention transmits messages through the P2MP PW between a PE and other PEs, thus decreasing the number of redundant messages on a physical link, increasing the forwarding efficiency of network, and reducing the network operating costs.

16 Claims, 5 Drawing Sheets

(56) References Cited

OTHER PUBLICATIONS

F. Jounay et al. "LDP Extensions for Source-initiated Point-to-Multipoint Pseudowire"; draft-jounay-niger-pwe3-source-initiated-p2mp-pw-03.txt; Network Working Group Internet Draft, Standards Track, Jan. 2010; Jul. 13, 2009; XP15063499A; See pp. 1-20.
Simon Delord et al. "Extension to LDP-VPLS for Ethernet Broadcast and Multicast"; draft-delord-l2vpn-ldp-vpls-broadcast-exten-01. txt; Network Working Group Internet Draft, Standard Track, Nov. 2010; May 19, 2010, XP15068598A; See pp. 1-15.
R. Aggarwal et al. "Multicast in VPLS", draft-ietf-l2vpn-vpls-mcast-05.txt; Network Working Group Internet Draft, Standards Track, Jan. 2010; Jul. 10, 2009; XP15063449A; See pp. 1-44.
F. Jounay et al. "Requirements for Point-to-Multipoint Pseudowire", draft-ietf-pwe3-p2mp-pw-requirements-02.txt; Network Working Group Internet Draft, Informational Track, Jun. 2010; XP15067478A; See pp. 1-19.

\* cited by examiner

METHOD AND SYSTEM FOR INCREASING FORWARDING EFFICIENCY OF VIRTUAL PRIVATE LAN SERVICE NETWORK

TECHNICAL FIELD

The present invention relates to the field of communications, and more especially, to a method and system for forwarding messages in the virtual private LAN services network.

BACKGROUND OF THE RELATED ART

The VPLS (Virtual Private LAN Services) is the L2VPN technology based on the Internet Protocol (IP)/Multi Protocol Label Switching (MPLS) and the Ethernet technology, and it is able to provide multi-point services like Ethernet in the Metropolitan Area Network (MAN) and the Wide Area Network (WAN). It establishes and maintains a pseudo wire (PW) between the provider edge (PE) nodes, encapsulates the layer 2 protocol frame and transmits and switches it through the PW, so that multiple local area networks in the wide area domain are integrated into one network in the data link layer, to provide the users with the virtual Ethernet service, thus supporting the point-to-point, point-to-multipoint and multi-point-to-multipoint services, which can support carrier-grade Ethernet services in a relatively large network scale.

Figure 1:
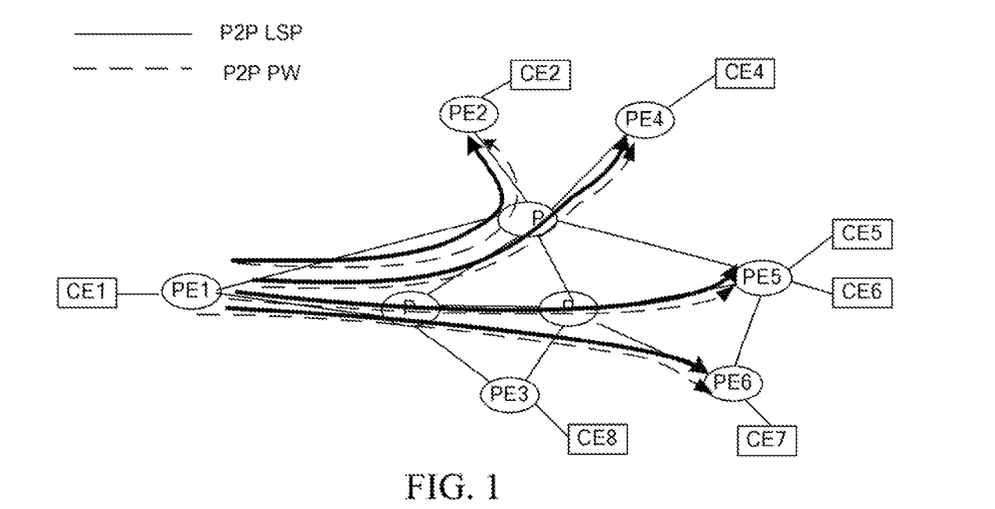
FIG. 1 is a schematic diagram of the VPLS network forwarding the multicast message, broadcast message and/or unknown unicast message in the related art.

In the past, the VPLS network is mainly used for forwarding unicast messages, and currently, with the development of multicast technology, the VPLS network transmits not only the unicast messages but also the broadcast, multicast and/or unknown unicast messages. When transmitting the broadcast, multicast and/or unknown unicast messages, it needs to rely on the provider edge to replicate the broadcast, multicast and/or unknown unicast messages, and it sends them to each receiving custom edge (CE) through a number of pseudo wires. As shown in FIG. 1, if the aforementioned pseudo wires transmit the data through the same shared physical path, there might be multiple copies of the same broadcast, multicast and/or unknown unicast messages in the shared physical path, which wastes the network bandwidth.

Figure 2:
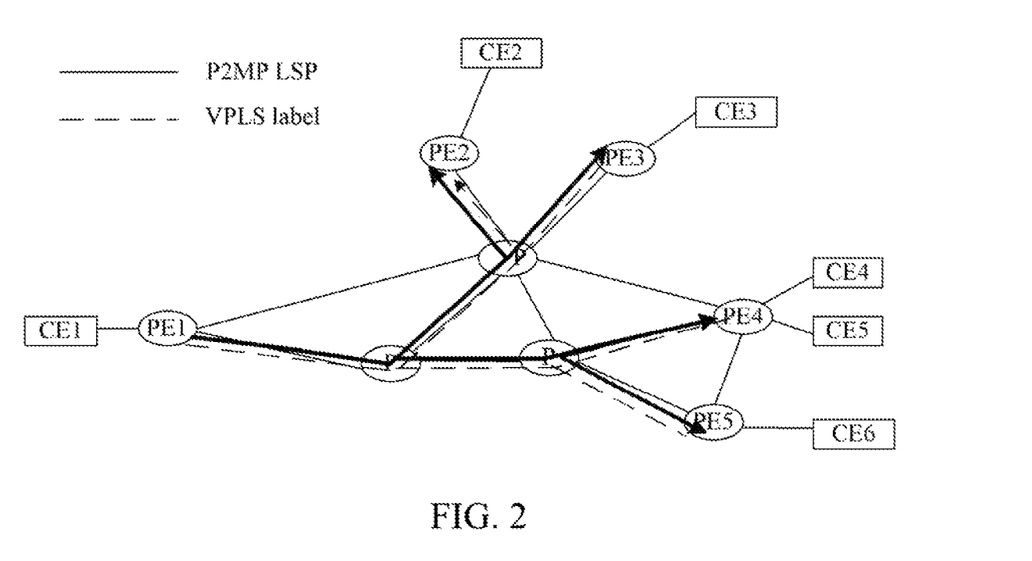
FIG. 2 is a schematic diagram of the VPLS network using the VPLS multicast aggregation technology to forward the multicast message, broadcast message and/or unknown unicast message in the related art.

Furthermore, the VPLS multicast technology is proposed by optimizing and improving the VPLS regarding to the multicast. The VPLS multicast technology provides the multicast service via the multicast tree of the operator. The VPLS multicast has the Inclusive Tree and the selective Tree, and the input source of the VPLS multicast is the IP multicast service data on the Attachment Circuit (AC) connected to the PE. The IP multicast service data generally use the inclusive tree to transmit, only when the IP multicast traffic exceeds the preset threshold value, the selective tree is used to transmit. As shown in FIG. 2, if the multicast tree of the operator is a inclusive tree aggregating multiple VPLS instances, that is, multiple services are transmitted through one multicast tree of operator, in order to distinguish the services at the user side, the IP multicast data need to be encapsulated with one VPLS instance label, and then it is transmitted via a point-to-multipoint (P2MP) multicast tree of the operator to the leaves on the P2MP multicast tree, that is the label switched router (LSR), of the operator.

Applying the aforementioned VPLS multicast optimization technology in the VPLS network needs to support the VPLS multicast signaling function; at the same time, the VPLS multicast uses the Border Gateway Protocol (BGP) as the signaling, which requires all the devices in the VPLS network to support the BGP protocol, since the complexity of the BGP protocol itself has relatively high requirements for the equipment, its implementation is relatively complicated, resulting in high operating cost.

SUMMARY OF THE INVENTION

The present invention provides a method and system for increasing forwarding efficiency of a virtual private LAN services (VPLS) network to reduce the number of redundant messages on a physical link, and its implementation is simple.

To achieve the aforementioned purpose of the present invention, the present invention provides the following technical solution:

a method for improving forwarding efficiency of a virtual private LAN services (VPLS) network comprises:

a root node provider edge (PE) in the VPLS network transmitting at least one of broadcast message, multicast message and unknown unicast message to leaf nodes PE within the same VPLS through a point-to-multipoint pseudo wire (P2MP PW).

The step of the root node PE transmitting at least one of broadcast message, multicast message and unknown unicast message to the leaf nodes PE within the same VPLS through the P2MP PW can comprise: after the root node PE receives a data message, if the type of the data message is judged as the broadcast message, multicast message and unknown unicast message, the received data message is transmitted to the leaf nodes through the point-to-multipoint pseudo wire.

All or part of the PEs in the VPLS network can transmit at least one of broadcast message, multicast message and unknown unicast message through the P2MP PW; the method further comprises: the root node PE in the VPLS network establishes a point-to-multipoint pseudo wire to the leaf nodes PE. When part of the PEs in the VPLS network can satisfy triggering conditions, at least one of broadcast message, multicast message and unknown unicast message are transmitted through the P2MP PW, and the triggering conditions can comprise: the traffic of at least one of currently replicated broadcast, multicast and unknown unicast messages reaches a preset threshold value.

The method can further have the following feature: when the PE is the root node PE, the root node PE establishes a point-to-multipoint pseudo wire to the leaf nodes PE in the VPLS network. The root node PE can establish the point-to-multipoint pseudo wire with the leaf nodes PE in the VPLS network as follows: configuring attachment group identifiers (AGI) and attachment individual identifiers (AII) of the root node PE in the root node PE; configuring the AGI and source AII (SAII) configured by the root node PE in the leaf nodes PE; the root node PE obtaining the leaf nodes PE within the same VPLS through static configuration or Border Gateway Protocol (BGP) auto-discovery; the root node PE using label distribution protocol to establish the P2MP PW, in this process, the root PE sending a label distribution protocol (LDP) mapping message carrying the [AGI, SAII] to the found leaf nodes PE in the VPLS network; the leaf nodes PE judging whether the locally configured [AGI, SAII] matches with the [AGI, SAII] carried in the LDP mapping message or not, if no, notifying the root node that the matching fails, if at least one PE matches successfully, the root node PE successfully establishing a P2MP PW which takes the PE that matches successfully as a leaf node, and if there is no PE matching successfully, the establishment of the P2MP PW failing.

The method can further comprise: after a leaf node PE receives the data message sent by the root node PE through the P2MP PW, it forwarding the data message to the recipient, and learning the media access control (MAC) address, taking a source MAC address of the data message as an index entry of a MAC forwarding table and a point-to-point pseudo wire (P2P PW) between present PE and root node PE as an output interface, thus forming a MAC forwarding table corresponding to the unicast message.

The present invention also provides a VPLS network system, comprising a plurality of PEs, wherein said a plurality of PEs comprises a root node PE and leaf nodes PE, wherein, the root node PE is configured to transmit at least one of broadcast message, multicast message and unknown unicast message to the leaf nodes PE within the same VPLS through a point-to-multipoint pseudo wire.

The root node PE can comprise: an establishment module, which can be configured to establish a point-to-multipoint pseudo wire with the leaf nodes PE in the VPLS network; a judgment module, which can be configured to judge the type of a data message after receiving the data message; a transmission module, which can be configured to, when judging that the data message is a broadcast message, multicast message or unknown unicast message, transmit the data message to the leaf nodes PE through the point-to-multipoint pseudo wire.

The system can further have the following feature: all the PEs in the VPLS network transmit at least one of the broadcast message, multicast message and unknown unicast message through the point-to-multipoint pseudo wire.

The system can further have the following feature: part of the PEs in the VPLS network transmit at least one of the broadcast message, multicast message and unknown unicast message through the point-to-multipoint pseudo wire. The root node PE can further comprise: a triggering module, which can be configured to trigger a local PE to establish the point-to-multipoint pseudo wire to the leaf nodes. The triggering module can also be configured to: when triggering conditions are met, control the local PE to transmit at least one of the broadcast message, multicast message and unknown unicast message through the point-to-multipoint pseudo wire, and the triggering conditions comprise: traffic of at least one of currently replicated broadcast, multicast and unknown unicast messages reaches a preset threshold value.

The establishment module can comprise: a configuration unit, which can be configured to configure the AGI and the AII of the root node PE; a discovery unit, which can be configured to find the leaf nodes PE in the same VPLS network; an establishment unit, which can be configured to use a label distribution protocol to establish the point-to-multipoint pseudo wire. A leaf node PE can comprise: a configuration module, which can be configured to configure the AGI and the SAII configured by the root node in the local PE; a judgment module, which can be configured to judge whether the locally configured [AGI, SAII] matches with the [AGI, SAII] carried in the label mapping message or not; a notification module, which can be configured to notify the root node PE that a leaf node PE is not added successfully to the P2MP PW.

The leaf node PE can comprise: a receiving module, which can be configured to receive the data message sent through the point-to-multipoint pseudo wire; a forwarding module, which can be configured to forward the received data message to a user recipient; a forwarding table management module, which can be configured to take a source MAC address of the data message as an index entry in a MAC forwarding table and the P2P PW between present PE and root node PE as an output interface, thus forming a MAC forwarding table corresponding to the unicast message.

The technical solution provided in the present invention transmits the message through the P2MP PW between the PE and the other PEs to reduce the number of redundant messages on the physical link and improve the forwarding efficiency of the network, and since the establishment of the P2MP PW uses the LDP protocol, the establishment method is simple and easy to be implemented, thus reducing the network operating cost.

PREFERRED EMBODIMENTS OF THE PRESENT INVENTION

In the present invention, the PE nodes in the VPLS transmit the broadcast, multicast and/or unknown unicast messages through the Point-to-Multipoint Pseudo wire (P2MP PW) between the local member and other members in the same VPLS.

In the following, the technical solution provided in the present invention will be described in further detail with combination of the accompanying figures.

The First Embodiment

Figure 4:
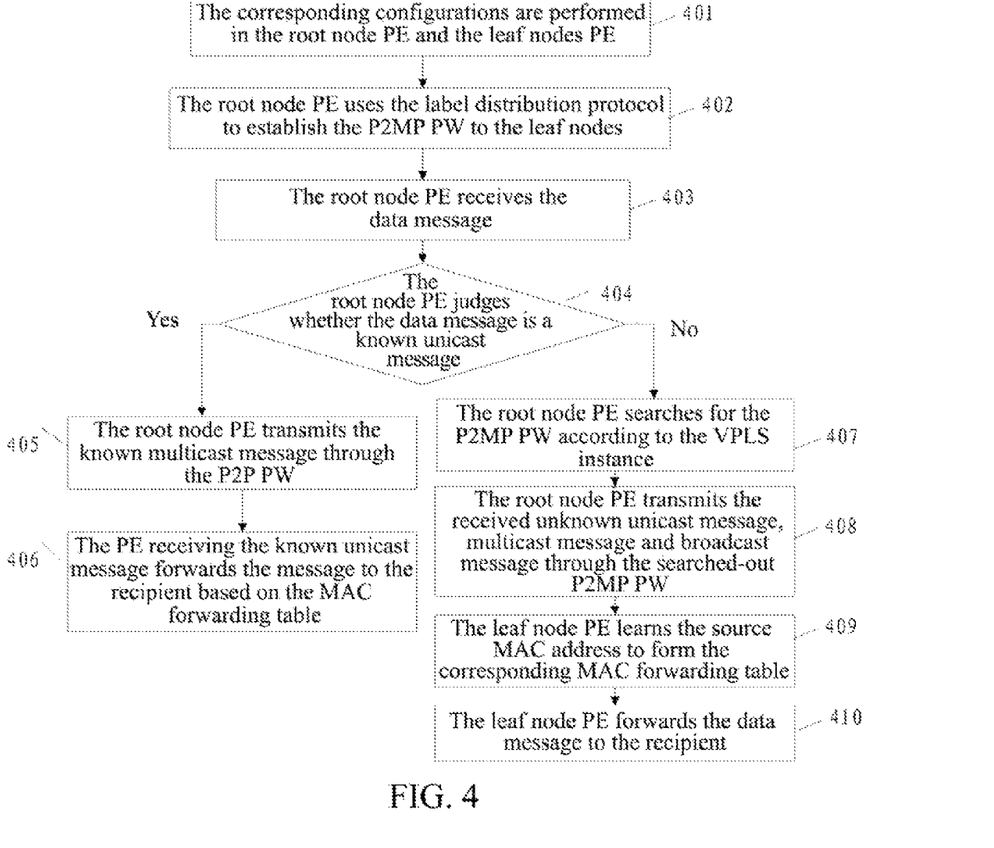
FIG. 4 is a flow chart of a method for transmitting the VPLS message in accordance with a first embodiment of the present invention.

In this embodiment, each PE node in the VPLS network transmits the broadcast message, multicast message and/or unknown unicast message through the P2MP PW, and in this embodiment, the PE1 is the root node, and the PE2, PE3, PE4 and PE5 are leaf nodes, and the specific process is shown in FIG. 4:

in step 401, the corresponding configurations are performed in the root node PE and the leaf nodes PE.

Herein, the root node PE is configured with the Attachment Group Identifiers (AGI) and the Attachment Individual Identifiers (AII). The leaf nodes PE are configured with the Attachment Group Identifiers (AGI) and the Source Attachment Individual Identifiers (SAII), denoted as the [AGI, SAII]. The AGI is the identifier identifying a virtual instance; the AII is used to identify the connection between the PE and the CE; the SAII is used to identify the connection between the entrance PE and the data message sender CE.

In this embodiment, the PE1 is configured with the AGI1 and AII12; and the PE2, PE3, PE4 and PE5 are configured with [AGI1, SAII12].

In step 402, the root node PE uses the label distribution protocol to establish the P2MP PW to the leaf nodes.

Specifically, before establishing the P2MP PW, the root node PE can acquire the other PEs within the same VPLS via the static configuration or the BGP auto-discovery. This embodiment takes other PEs except of the root node PE in the same VPLS as the leaf nodes PE relative to the root node PE.

Before establishing the P2MP PW, the root node searches for the low layer tunnel P2MP LSP of P2MP PW in the established P2MP LSP, and the establishment of the P2MP LSP can use the RSVP-TE or MLDP technology.

The root node PE sends the Label Distribution Protocol (LDP) mapping message carrying the [AGI, SAII] to other PEs in the VPLS network; other PEs judge whether the locally configured [AGI, SAII] matches with the [AGI, SAII] carried in the LDP mapping message or not, if no, the root node is notified that the matching fails, if at least one PE matches successfully, the root node successfully establishes a P2MP PW which takes the PE that matches successfully as a leaf node, if no PE matches successfully, the establishment of the P2MP PW fails.

In step 403, the root node PE receives the data message.

Figure 3:
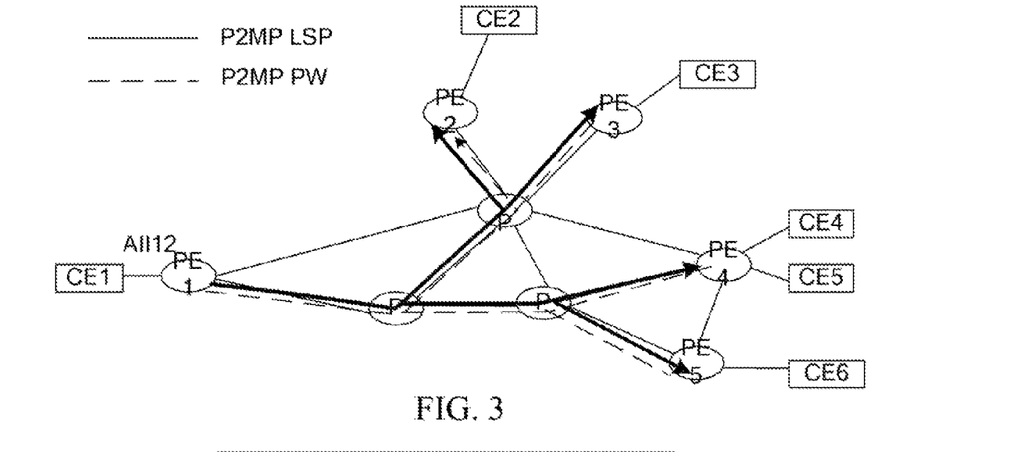
FIG. 3 is a schematic diagram of transmitting the multicast message, broadcast message and/or unknown unicast message in the present invention.

For example, FIG. 3 is a schematic diagram of forwarding the multicast message, broadcast message and/or unknown unicast message, and the CE1 sends the data message to the PE1. Herein, the CE1 could send any messages, such as the known unicast message, unknown unicast message, broadcast message as well as multicast message.

In step 404, the root node PE judges whether the data message is a known unicast message or not.

In this embodiment, the PE1 determines the type of messages according to the range of MAC address. If the message is a broadcast message or a multicast message, then proceed to steps 407~410. If it is a unicast message, the search is further performed in the MAC forwarding table, and if the message can be found, the unicast message is determined as a known unicast message, then proceed to steps 405~406; otherwise, the unicast message is determined as an unknown unicast message, proceed to steps 407~410.

In step 405, the root node PE transmits the known unicast message through the P2P PW.

In this embodiment, the PE1 forwards the known unicast message to the recipient PE based on the MAC forwarding table.

In step 406, the PE receiving the known unicast message forwards the message to the recipient CE based on the MAC forwarding table, to complete the transmission of the known unicast message.

In step 407, the root node PE searches for the P2MP PW according to the VPLS instance.

In this embodiment, the VPLS instance is judged according to the input port of the data message, and then the P2MP PW corresponding to this VPLS instance is searched. The VPLS instance and P2MP PW forms a one-to-more relationship, because each PE can be either a root node or a leaf node.

In step 408, the root node PE transmits the received unknown unicast message, multicast message and broadcast message through the searched-out P2MP PW.

In this embodiment, the PE1 forwards the message to the PE2, PE3, PE4 and PE5 through the P2MP PW1.

In step 409, the leaf node PE learns the source MAC address to form the corresponding MAC forwarding table.

In this embodiment, after the PE2, PE3, PE4 and PE5 receive an unknown unicast message, multicast message and/or broadcast message, they learn the MAC address, thus forming a MAC forwarding table corresponding to the unicast message: the leaf node PE selects the source MAC address of the unknown unicast message, multicast message and/or broadcast message as the index entry of the MAC forwarding table and selects the P2P PW between the present PE (PE2, PE3, PE4 and PE5) and the PE1 as the output interface.

In step 410, the leaf node PE forwards the data message to the recipient CE.

The leaf node PE forwards the unknown unicast message, multicast message and/or broadcast message to all recipient CEs connected with the leaf nodes PE. Of course for the multicast message, if a leaf node supports the IGMP function, it can be accurately forwarded to the recipient CE which needs the traffic through the IGMP leaf forwarding table.

It should be noted that in practical applications, the PE2, PE3, PE4, PE5 and PE6 need to have the same configuration as the PE1 and support the same function. For example, it needs to establish the P2MP PW that takes the PE2 as the root node and the PE1, PE3, PE4 and PE5 as the leaf nodes.

The Second Embodiment

Figure 5:
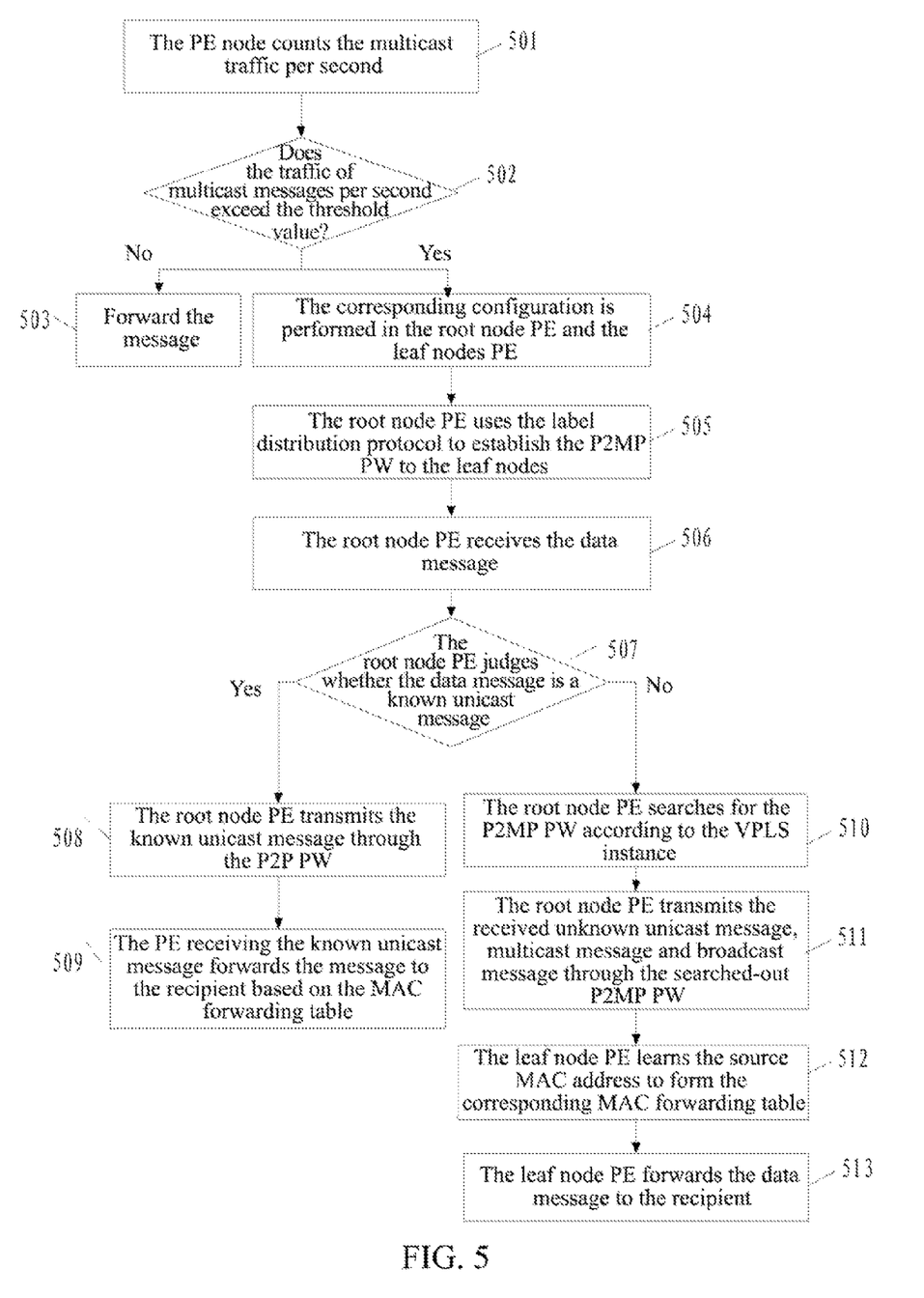
FIG. 5 is a flow chart of a method for transmitting the VPLS message in accordance with a second embodiment of the present invention.

In this embodiment, when the PE nodes in the VPLS network meet the set strategy, the broadcast message, multicast message and/or unknown unicast message are transmitted through the P2MP PW. The strategy whether each PE node uses the P2MP PW to transmit the broadcast message, multicast message and/or unknown unicast message or not can be the threshold triggering, that is, when the traffic replicated by a certain PE node exceeds a certain threshold value, the PE is taken as the root node and other PEs in the same VPLS instance are taken as leaf nodes to establish the P2MP PW, and the specific process is shown in FIG. 5:

In step 501, the PE node counts the multicast traffic per second.

In this embodiment, take the PE1 counting the traffic of the multicast messages per second for example to illustrate.

In step 502, the PE nodes judges whether the traffic of the multicast messages per second exceeds the threshold value or not:

if the traffic of the multicast messages per second counted by the PE1 does not exceed the maximum value set by the PE1, the PE node uses the existing method to transmit the multicast message, broadcast message and/or unknown unicast message so that all the PE members in the same VPLS instance can receive messages. The messages are forwarded (step 503);

if the traffic of the multicast messages per second counted by PE1 exceeds the maximum value set by the PE1, proceed to the subsequent steps 504~513, the process of steps 504 to 513 is the same as that of steps 401~410 and it is not repeated here.

It should be noted that, this embodiment performs the establishment of P2MP PW when the traffic reaches the threshold value, and then the data message is forwarded after the P2MP PW is established, or the P2MP PW can be established in advance, and after the traffic reaches the threshold value, the data message can be forwarded through the pre-established P2MP PW.

Correspondingly, the present invention also provides a Virtual Private LAN Services network system using the aforementioned method, comprising the root node PE and the leaf nodes PE, wherein the root node PE transmits at least one of the broadcast message, multicast message and unknown unicast message to the leaf nodes PE within the same VPLS through the point-to-multipoint pseudo wire.

Figure 6:
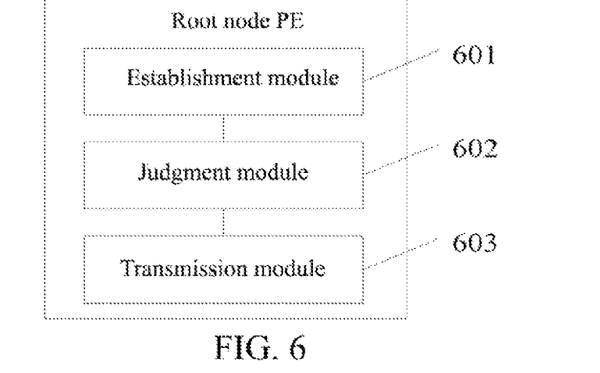
FIG. 6 is a structural schematic diagram of the root node PE in the present invention.

As shown in FIG. 6, the root node PE comprises:

the establishment module 601, which can be configured to establish a point-to-multipoint pseudo wire with other PEs in the VPLS network;

the judgment module 602, which can be configured to judge the message type of a data message after receiving the data message;

the transmission module 603, which can be configured to, when judging that the data message is a broadcast message, multicast message or unknown unicast message, transmit the data message to the leaf nodes PE through the point-to-multipoint pseudo wire.

Furthermore, all the PEs in the VPLS network transmit at least one of the broadcast message, multicast message and unknown unicast message through the point-to-multipoint pseudo wire.

Furthermore, part of the PEs in the VPLS network transmit at least one of the broadcast message, multicast message and unknown unicast message through the point-to-multipoint pseudo wire.

Figure 7:
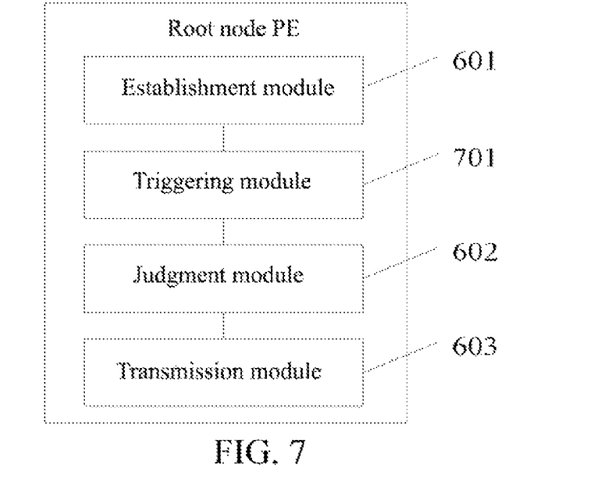
FIG. 7 is another structural schematic diagram of the root node PE in the embodiment shown in FIG. 6.

Furthermore, as shown in FIG. 7, the root node PE can also comprise:

the triggering module 701, which can be configured to trigger a local PE to establish the point-to-multipoint pseudo wire to the leaf nodes.

Furthermore, the triggering module 701 can also be configured to: when triggering conditions are met, control the local PE to transmit at least one of the broadcast message, multicast message and unknown unicast message through the point-to-multipoint pseudo wire, and the triggering conditions comprise: traffic of at least one of currently replicated broadcast, multicast and unknown unicast messages reaches a preset threshold value.

Figure 8:
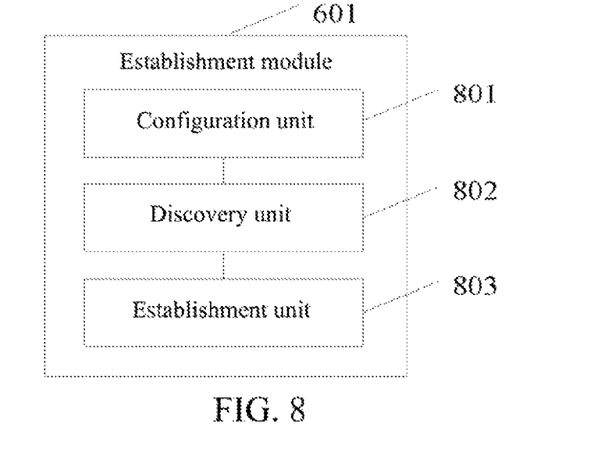
FIG. 8 is a structural schematic diagram of the establishment module 601 in the embodiment shown in FIG. 6.

Furthermore, as shown in FIG. 8, the establishment module specifically comprises:

the configuration module 801, which can be configured to configure the access group identifiers (AGI) and the access specific identifiers (AII) of the root node PE;

the discovery unit 802, which can be configured to find other PEs in the same VPLS network;

the establishment unit 803, which can be configured to use the label distribution protocol to establish the point-to-multipoint pseudo wire.

Figure 9:
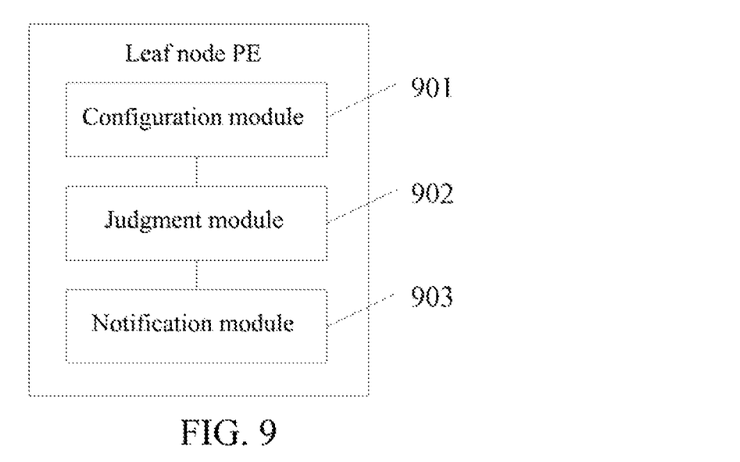
FIG. 9 is a structural schematic diagram of a leaf node PE in the present invention.

Furthermore, as shown in FIG. 9, the leaf node PE comprises:

the configuration module 901, which can be configured to configure the AGI and SAII configured by the root node;

the judgment module 902, which can be configured to judge whether the locally configured [AGI, SAII] matches with the [AGI, SAII] carried in the label mapping message or not;

the notification module 903, which can be configured to notify the root node PE that the leaf node PE is not added successfully to the P2MP PW.

Figure 10:
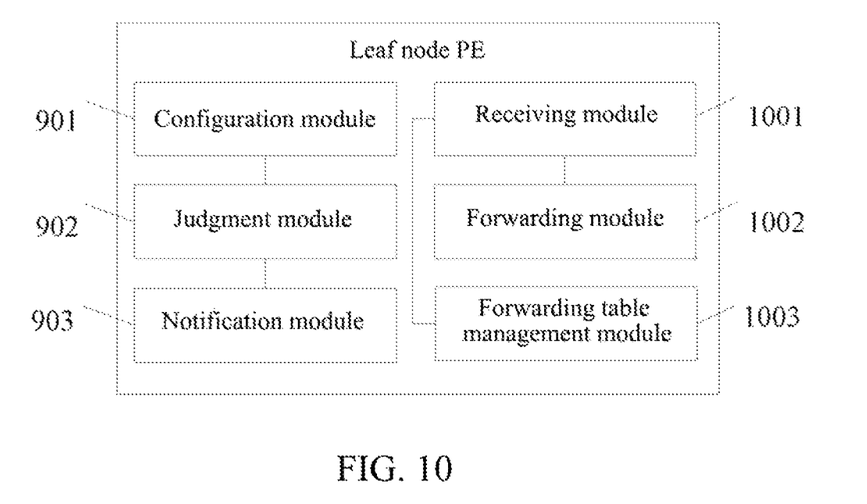
FIG. 10 is another structural schematic diagram of the leaf node PE in the embodiment shown in FIG. 9.

Optionally, as shown in FIG. 10, the leaf node PE also comprises:

the receiving module 1001, which can be configured to receive the data message sent through the point-to-multipoint pseudo wire;

the forwarding module 1002, which can be configured to forward the received data message to the user recipient;

the forwarding table management module 1003, which can be configured to take the source MAC address of the data message as the index entry in the MAC forwarding table and the P2P PW between the present PE and the root node PE as the output interface, forming a MAC forwarding table corresponding to the unicast message.

Those skilled in the field can understand that all or part of the steps in the aforementioned embodiment can be achieved by the program instructing the related hardware, and the program can be stored in a computer readable storage medium, when the program is in execution, it includes one or a combination of steps of the method embodiment.

In addition, various function units in the various embodiments of the present invention can be implemented in the form of hardware or software function modules. If the integrated module is implemented in the form of a software function module and sold or used as a standalone product, it can also be stored in a computer readable storage medium.

The aforementioned storage medium can be a read-only memory, magnetic disk or CD-ROM and so on.

The above description is only the specific implementation of the present invention, but the protection scope of the present invention is not limited to the above description, and within the technical range disclosed in the present invention, those skilled in the field can easily think of changes or replacements, and these changes and replacements should be included within the protection scope of the present invention. Therefore, the protection scope of the present invention should be subject to the protection scope of the claims.

INDUSTRIAL APPLICABILITY

Compared with the prior art, in the present invention, the message is transmitted through the P2MP PW between the PE and other PEs to reduce the number of redundant messages on the physical link and improve the forwarding efficiency of the network, and since the establishment of the P2MP PW uses the LDP protocol, the establishment method is simple and easy to be implemented, thus reducing the network operating cost.

What is claimed is:

1. A method for improving forwarding efficiency of a virtual private LAN services (VPLS) network, comprising:

a root node provider edge (PE) in the VPLS network establishing a point-to-multipoint pseudo wire (P2MP PW) to leaf nodes PE within the same VPLS;

the root node provider edge (PE) in the VPLS network transmitting at least one of broadcast message, multicast message and unknown unicast message to the leaf nodes PE within the same VPLS through the point-to-multipoint pseudo wire (P2MP PW), wherein all or part of the PEs in the VPLS network transmits at least one of the broadcast message, multicast message and unknown unicast message through the P2MP PW;

after receiving a data message sent by the root node PE through the P2MP PW, the leaf node PE forwarding the data message to a recipient, and learning a media access control (MAC) address, taking a source MAC address of the data message as an index entry of MAC forwarding table and a point-to-point pseudo wire (P2P PW) between present PE and the root node PE as an output interface, thus forming a MAC forwarding table corresponding to a unicast message.

2. The method of claim 1, wherein the step of the root node PE transmitting at least one of broadcast message, multicast message and unknown unicast message to the leaf nodes PE within the same VPLS through the P2MP PW comprises:

after the root node PE receives a data message, if message type of the received data message is judged as the broadcast message, multicast message and unknown unicast message, transmitting the data message to the leaf nodes PE through the P2MP PW.

3. The method of claim 1, wherein part of the PEs in the VPLS network transmitting at least one of the broadcast message, multicast message and unknown unicast message through the P2MP PW refers:

when part of the PEs in the VPLS network meet triggering conditions, at least one of the broadcast message, multicast message and unknown unicast message are transmitted through the P2MP PW, and the triggering conditions comprise: traffic of at least one of currently replicated broadcast, multicast and unknown unicast messages reaching a preset threshold value.

4. The method of claim 1, wherein when the PE is the root node PE, the root node PE establishes the point-to-multipoint pseudo wire with the leaf nodes PE in the VPLS network.

5. The method of claim 4, wherein the root node PE establishes the point-to-multipoint pseudo wire with the leaf nodes PE in the VPLS network as follows:

configuring attachment group identifiers (AGI) and attachment individual identifiers (AII) of the root node PE in the root node PE;

configuring the AGI and source AII (SAII) configured by the root node PE in the leaf nodes PE;

the root node PE obtaining the leaf nodes PE within the same VPLS through static configuration or Border Gateway Protocol (BGP) auto-discovery;

the root node PE using a label distribution protocol to establish the P2MP PW, in this process, the root node PE sending a label distribution protocol (LDP) mapping message carrying AGI, SAII to the found leaf nodes PE in the VPLS network; the leaf nodes PE judging whether locally configured AGI, SAII matches with the AGI, SAII carried in the LDP mapping message or not, if no, notifying the root node that matching fails, if at least one PE matches successfully, the root node PE successfully establishing a P2MP PW which takes the PE that matches successfully as a leaf node, and if there is no PE matching successfully, establishment of the P2MP PW failing.

6. A virtual private LAN services (VPLS) network system, comprising a plurality of PEs, wherein said a plurality of PEs comprises a root node PE and leaf nodes PE, wherein, the root node PE is configured to transmit at least one of broadcast message, multicast message and unknown unicast message to the leaf nodes PE within the same VPLS through a point-to-multipoint pseudo wire; and the leaf node PE comprises:

a receiving module, which is configured to receive the data message sent through the point-to-multipoint pseudo wire;

a forwarding module, which is configured to forward the received data message to a user recipient;

a forwarding table management module, which is configured to take a source MAC address of the data message as an index entry of MAC forwarding table and a point-to-point pseudo wire between present PE and the root node PE as an output interface, thus forming a MAC forwarding table corresponding to a unicast message.

7. The system of claim 6, wherein the root node PE comprises:

an establishment module, which is configured to establish the point-to-multipoint pseudo wire with the leaf nodes PE in the VPLS network;

a judgment module, which is configured to judge a message type of a data message after receiving the data message;

a transmission module, which is configured to, when judging that the data message is the broadcast message, multicast message or unknown unicast message, transmit the data message to the leaf nodes PE through the point-to-multipoint pseudo wire.

8. The system of claim 7, wherein the establishment module comprises:

a configuration unit, which is configured to configure AGI and AII of the root node PE;

a discovery unit, which is configured to find the leaf nodes PE in the same VPLS network;

an establishment unit, which is configured to use a label distribution protocol to establish the point-to-multipoint pseudo wire.

9. The system of claim 7, wherein all the PEs in the VPLS network transmit at least one of the broadcast message, multicast message or unknown unicast message through the point-to-multipoint pseudo wire.

10. The system of claim 7, wherein part of the PEs in the VPLS network transmit at least one of the broadcast message, multicast message or unknown unicast message through the point-to-multipoint pseudo wire.

11. The system of claim 7, wherein the leaf node PE comprises:

a configuration module, which is configured to configure AGI and SAII configured by the root node PE in a local PE;

a judgment module, which is configured to judge whether locally configured AGI, SAII matches with AGI, SAII carried in a label mapping message or not;

a notification module, which is configured to notify the root node PE that the leaf node PE is not added successfully to the point-to-multipoint pseudo wire.

12. The system of claim 6, wherein all the PEs in the VPLS network transmit at least one of the broadcast message, multicast message or unknown unicast message through the point-to-multipoint pseudo wire.

13. The system of claim 6, wherein part of the PEs in the VPLS network transmit at least one of the broadcast message, multicast message or unknown unicast message through the point-to-multipoint pseudo wire.

14. The system of claim 13, wherein the root node PE further comprises:

a triggering module, which is configured to trigger a local PE to establish the point-to-multipoint pseudo wire to the leaf nodes.

15. The system of claim 14, wherein, the triggering module is further configured to: when triggering conditions are met, control the local PE to transmit at least one of the broadcast message, multicast message and unknown unicast message through the point-to-multipoint pseudo wire, and the triggering conditions comprise: traffic of at least one of currently replicated broadcast, multicast and unknown unicast messages reaching a preset threshold value.

16. The system of claim 6, wherein the leaf node PE comprises:

a configuration module, which is configured to configure AGI and SAII configured by the root node PE in a local PE;

a judgment module, which is configured to judge whether locally configured AGI, SAII matches with AGI, SAII carried in a label mapping message or not;

a notification module, which is configured to notify the root node PE that the leaf node PE is not added successfully to the point-to-multipoint pseudo wire.

\* \* \* \* \*